Patented May 19, 1931

1,805,919

UNITED STATES PATENT OFFICE

KURT H. MEYER, OF MANNHEIM, AND CURT SCHUSTER, OF LUDWIGSHAFEN-ON-THE-RHINE, GERMANY, ASSIGNORS, BY MESNE ASSIGNMENTS, TO GENERAL ANILINE WORKS, INC., OF NEW YORK, N. Y., A CORPORATION OF DELAWARE

MANUFACTURE OF AZO DYESTUFFS

No Drawing.   Application filed August 31, 1925.  Serial No. 53,741.

The present invention relates to the production of azo dyestuffs possessing valuable properties and to the production of dyeings on textile material prepared from cellulose esters especially cellulose acetate silk.

The new azo dyestuffs, in accordance with our invention, are characterized by the presence of the mono-ethanol-amino group (-NH.CH$_2$.CH$_2$.OH) one or more of which group may be contained in the molecule of the dyestuff but in the absence of sulfonic acid groups. The dyestuff of the aforesaid type can be made according to the method suitable for producing azo dyestuffs, and the ethanol-amino group can be introduced into the molecule either by employing components containing such group or groups or by introducing the ethanol group into the amino group of the amino azo compound in such a way that mono-ethanol-amino-derivatives are produced, but any other method suitable for preparing azo compounds containing the mono-ethanol-amino group may also be used. The said dyestuffs are excellently suitable for dyeing cellulose acetate silk from an aqueous solution or suspension, with or without an addition of Turkey red oil or similar dispersing agents or other auxiliaries in dyeing.

The invention is more fully explained by the following examples to which however the invention is not restricted. The parts are by weight.

Example 1

27.6 parts of paranitraniline are diazotized in the usual manner and the solution of the diazonium compound is allowed to run, while cooling, into a solution prepared as follows: 27.4 parts of mono-ethanol-aniline are mixed with 12 parts of glacial acetic acid diluted with 200 parts of water and mixed with 75 parts of crystallized sodium acetate dissolved in 200 parts of water. The dyestuff is separated out, sucked off and may be employed as a paste or in the powder form. It is readily soluble in hot water and dyes cellulose acetate silk beautiful orange red shades of very good fastness. The dyestuff corresponds to the formula

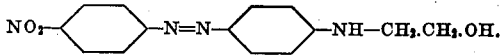

A red dyestuff corresponding to the formula

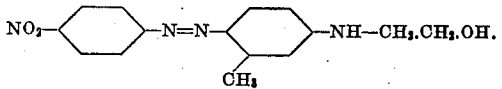

is obtained from 10.8 parts of mono-ethanol-meta-toluidine by dissolving them in 9 parts of hydrochloric acid and 40 parts of water and combining them with a solution of the diazonium compound prepared from 10 parts of paranitraniline.

Example 2

30.4 parts of 3-nitro-4.1-toluidine are triturated with 90 parts of hydrochloric acid of 19 degrees Baumé and mixed first with 300 parts of ice and afterwards, by portions, with 13.8 parts of sodium nitrite. The diazo solution so obtained is caused to run into a solution prepared from 27.4 parts of mono-ethanol-aniline, 12 parts of glacial acetic acid, 85 parts of sodium acetate and 500 parts of water. When the solutions are mixed, the liquor is neutralized with sodium carbonate and the dyestuff is separated by filtration. It may be made into a paste with an addition of Turkey red oil which paste with hot water gives a dye-bath from which cellulose acetate silk is dyed orange. The dyestuff corresponds to the formula

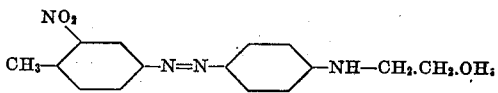

We claim:
1. As new articles of manufacture, azo coloring matters of the general formula:

$$O_2N-R-N=N-R-NH.CH_2.CH_2.OH$$

wherein R represents a residue of the benzene series which is free from sulfonic acid groups.

2. As new articles of manufacture the azo dyestuffs corresponding to the following formula:

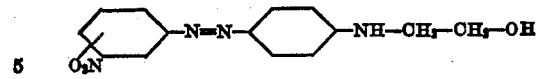

in which the benzene radicles may be substituted by alkyl groups.

3. As new articles of manufacture, the azo dyestuffs which correspond to the formula:

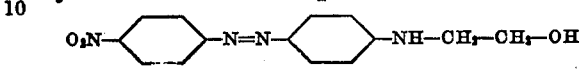

in which the benzene radicles may be substituted by alkyl groups.

4. As a new article of manufacture the red azo dyestuff which corresponds to the formula:

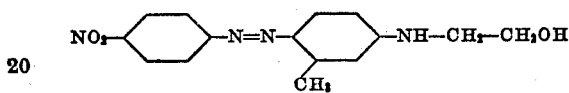

5. As a new article of manufacture a cellulose ester colored with the dye of claim 1.

6. The process of producing dyeings on cellulose esters which comprises applying to the cellulose ester an unsulfonated azo coloring matter derived from a diazotized para-nitro-amino compound of the benzene series and a mono-ethanol-amino compound of the benzene series.

7. As a new article of manufacture a cellulose ester colored with the dye of claim 3.

In testimony whereof we have hereunto set our hands.

KURT H. MEYER.
CURT SCHUSTER.